United States Patent [19]
Sterling

[11] Patent Number: 5,952,623
[45] Date of Patent: Sep. 14, 1999

[54] PNEUMATIC HAND TOOL EXHAUST MUFFLER

[76] Inventor: Robert E. Sterling, 22711 N. Glen Dr., Colbert, Wash. 99005

[21] Appl. No.: 08/999,588

[22] Filed: Jan. 13, 1998

[51] Int. Cl.$^6$ ..................................................... F01N 3/02
[52] U.S. Cl. ........................................... 181/230; 181/258
[58] Field of Search .................................... 181/230, 229, 181/243, 252, 256, 258, 282; 173/DIG. 2; 55/276

[56] References Cited

U.S. PATENT DOCUMENTS

| | | |
|---|---|---|
| 3,526,293 | 9/1970 | Hayes et al. . |
| 3,667,571 | 6/1972 | Fattelay . |
| 3,675,732 | 7/1972 | Rosen et al. . |
| 3,811,251 | 5/1974 | Gibel . |
| 3,880,245 | 4/1975 | Anderson, Jr. ........................... 181/230 |
| 3,880,252 | 4/1975 | Mucka ..................................... 181/230 |
| 4,134,472 | 1/1979 | Trainor . |
| 4,184,564 | 1/1980 | Trainor . |
| 4,205,732 | 6/1980 | Auerbach et al. . |
| 4,565,259 | 1/1986 | Stoll . |
| 5,097,924 | 3/1992 | Reeves . |
| 5,418,339 | 5/1995 | Bowen et al. . |

*Primary Examiner*—Khanh Dang
*Attorney, Agent, or Firm*—Christensen O'Connor Johnson & Kindness PLLC

[57] ABSTRACT

A muffler (30) for quieting exhaust expelled from a pneumatic hand tool (10) having a handle (12), an air intake port, and an exhaust port. The muffler (30) includes an inner tube with a plurality of holes, a number of washers (36) positioned longitudinally about the inner tube (32) at the location of the plurality of holes, and a flexible outer sleeve (34) positioned about the combination of washers (36) and inner tube (32). The inner tube includes a proximal end adapted to connect to the pneumatic hand tool exhaust port. During use, exhaust air pass from the hand tool (10) out the exhaust port, into the inner tube, out the inner tube holes, into the washers, through the washers, and out the flexible outer sleeve.

18 Claims, 5 Drawing Sheets

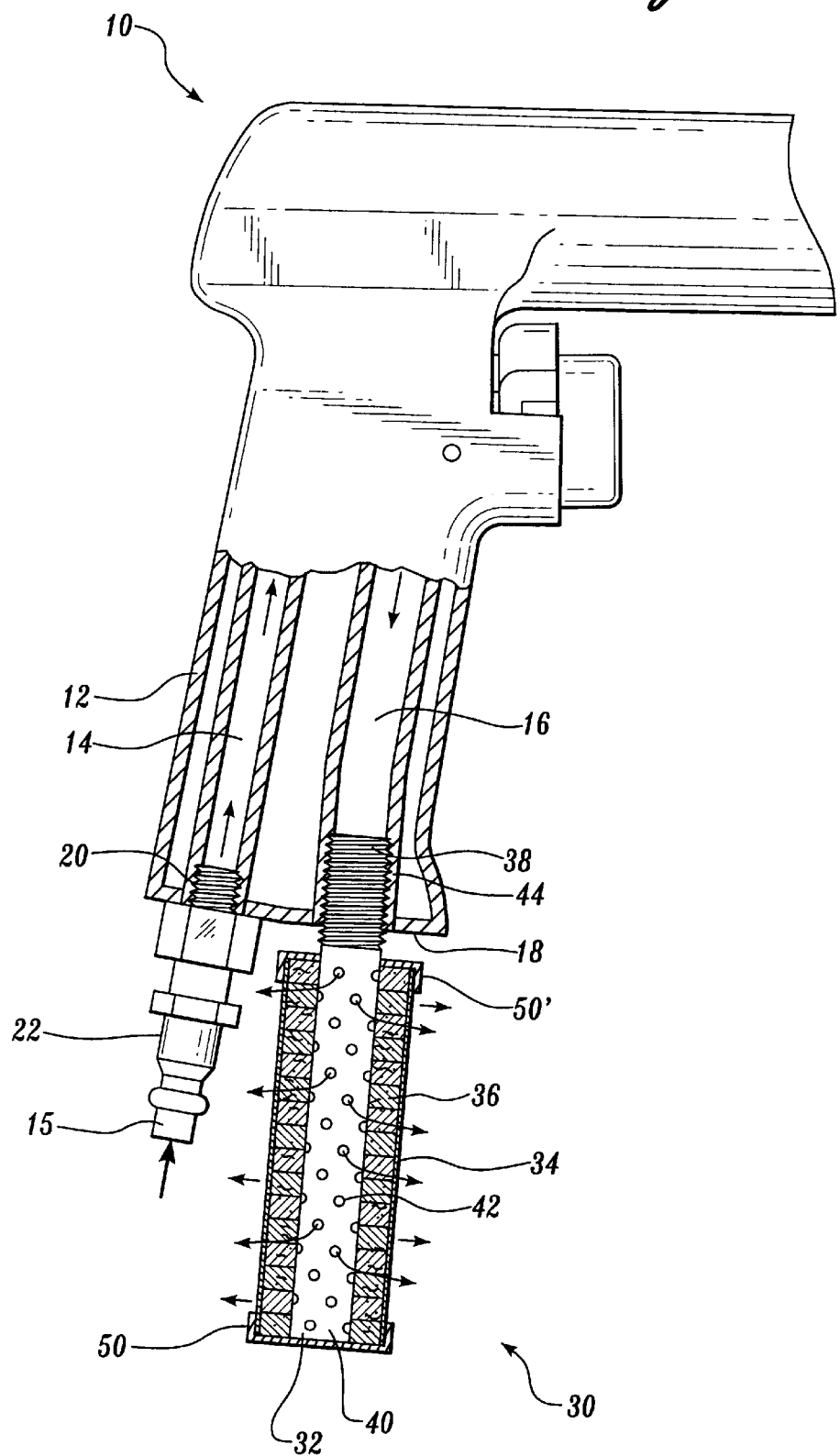

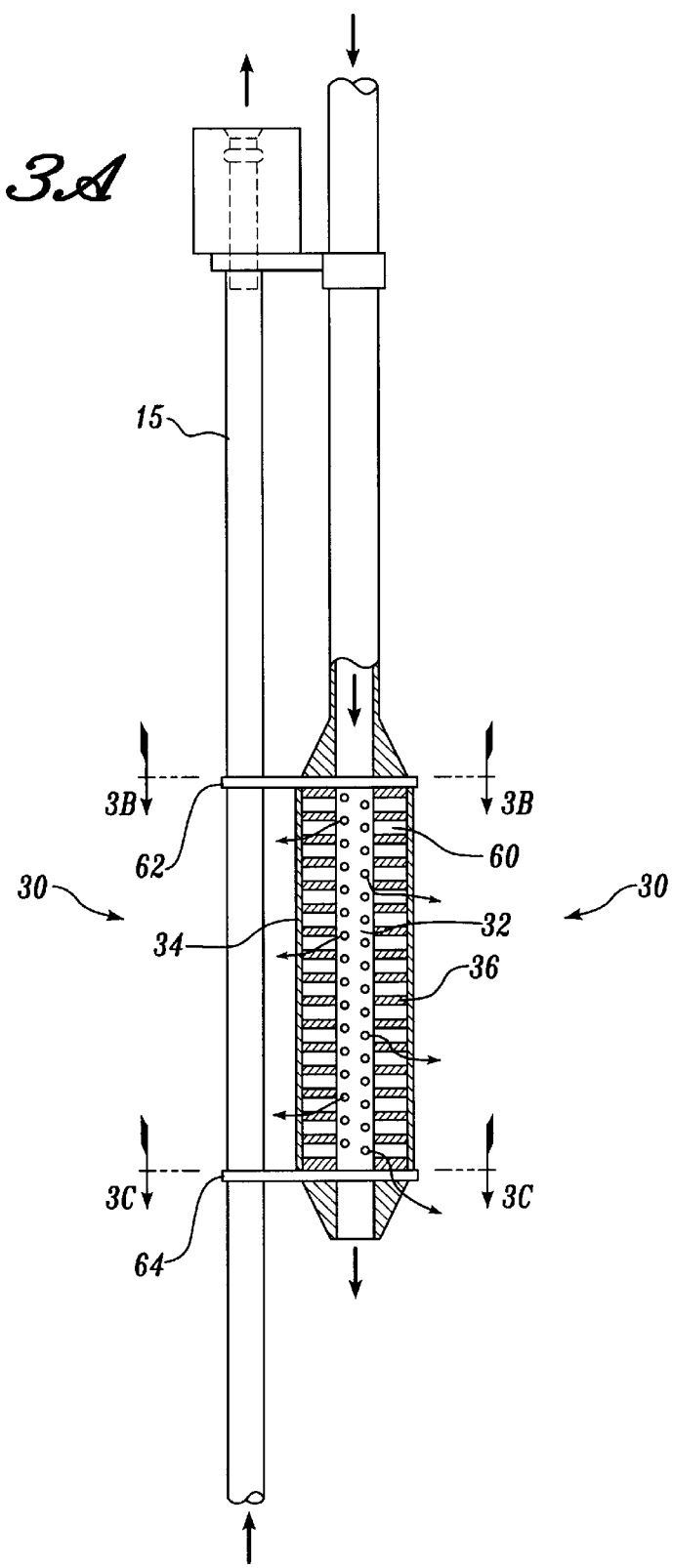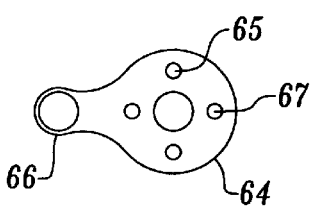

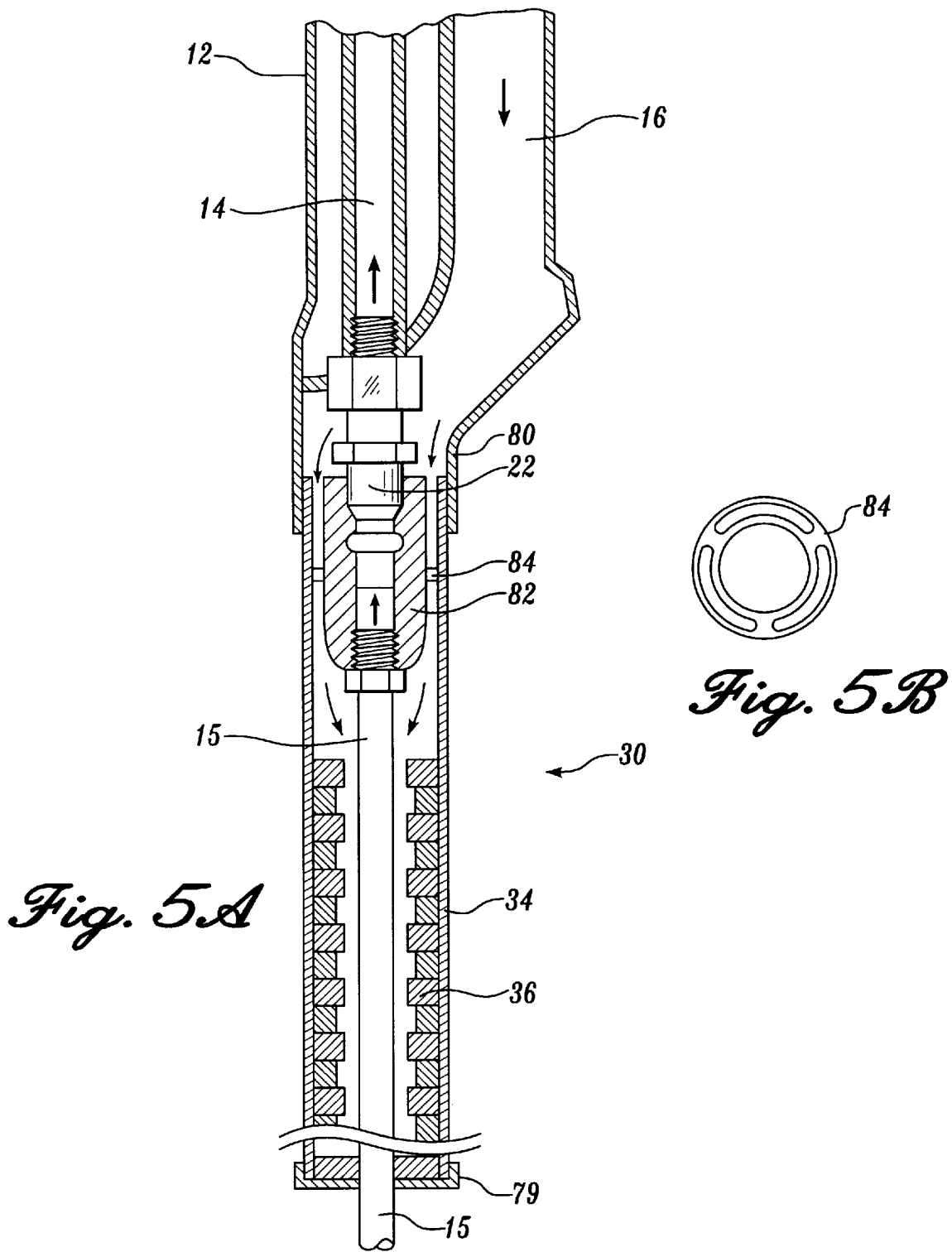

PNEUMATIC HAND TOOL EXHAUST MUFFLER

FIELD OF THE INVENTION

The present invention relates to acoustics and sound modifying means for muffling and filtering air, and more particularly to devices for muffling and filtering air exhausted from pneumatically-operated hand tools, equipment, machines, and the like.

BACKGROUND OF THE INVENTION

Pneumatic hand tools are commonly used in industrial and residential settings. Various types of pneumatic hand tools are available, including ratchets, drills, wrenches, grinders, sanders, etc. Known hand tools typically include a handle having a hollow internal chamber. The chamber includes an air intake passage and an air exhaust passage. Each passage extends between a motor and an opening in the bottom surface of the handle. The portion of the intake passage located near its respective handle opening includes components adapted to connect to a standard air coupler or the like. The coupler is in communication with a pressured air supply source. The exhaust passage opens to the atmosphere. When exhaust air is vented from the hand tool, a considerable amount of noise and particulate debris is generated, potentially causing auditory and/or respiratory damage to the operator and others located nearby.

Although ear plugs and face masks are available to workers, they are often not used for a number of reasons—most typically because they are not convenient. Numerous attempts have been made by hand tool manufacturers, therefore, to reduce the amount of noise and particles generated by the hand tool itself. These attempts include designing quieter and cleaner motors and designing hand tool components that suppress noise and trap waste prior to expulsion from the hand tool. For example, U.S. Pat. No. 5,418,339 describes a pneumatic hand tool having an exhaust port filled with a web of non-woven fibers coated with a binder resin. These types of mufflers have had some success in muffling sound, but there is often an increase in back pressure to the motor causing a decrease in the operating efficiency of the hand tool. The operating efficiency of a tool is typically measured in the operating speed of the motor in revolutions per minute (rpm) at a certain gauge pressure.

Cylindrical canister-type combination muffler and air filters are known for large machines, such as hoists and presses. For example, U.S. Pat. No. 4,134,472 describes a combination muffler and air filter having a central tubular member with a number of slots. The tubular member is surrounded by a disposable canister having inner and outer perforated rigid cylinders encasing a series of stacked annular filter members. Exhaust air passes through the inner cylinder, into the filters, and out the outer cylinder. These devices are not typically used for hand tools, however, because of they are large, heavy, and difficult to maneuver.

Thus, there exists a need for a noise muffling system that can reduce sound levels and remove entrained solid and liquid contaminates from the exhausted air before it is discharged to the atmosphere. The ideal device would effectively muffle and filter the exhaust air without creating substantial amounts of back pressure. This would allow a hand tool to be operated without jeopardizing performance of the pneumatic tool over long periods of usage. The ideal muffling system would further attach to a hand tool body and remain attached even during significant tool vibrations. In addition, it would be desirable to have a muffler that can be easily attached to existing pneumatic hand tools. The present invention is directed to fulfilling this need.

SUMMARY OF THE INVENTION

In accordance with aspects of the present invention, a muffler for quieting exhaust expelled from a pneumatic hand tool is provided. The hand tool has a handle, an air intake port, and an exhaust port. The muffler includes an inner tube with a plurality of holes, a number of washers positioned longitudinally about the inner tube at the location of the plurality of holes, and a flexible outer sleeve positioned about the combination of washers and inner tube. The inner tube includes a proximal end adapted to connect to the pneumatic hand tool exhaust port. The outer sleeve includes a plurality of passages through which air may pass. During use, exhaust air passes from the hand tool out the exhaust port, into the inner tube, out the inner tube holes into the washers, through the washers, and out the flexible sleeve.

In accordance with further aspects of this invention, preferred embodiments of the connection of the muffler to the handle include threading or gluing the inner tube proximal end into the exhaust port. The washers are preferably formed from a sound absorbing material such as felt, gauze, rubber, foam, synthetic fiber, or the like. The outer sleeve is preferably formed from a flexible material such as woven nylon, canvas, synthetic fabric, perforated tape, perforated sealant, perforated malleable plastic, perforated plastic synthetic, etc.

In accordance with other aspects of this invention, one embodiment of a muffler is provided in which the washers are placed side-by-side along the inner tube and are of equal densities. The inner holes of the washers directly contact the inner tube. A first end cap is attached to a first washer, and a second end cap is attached to a last washer. The end caps are solid and do not allow airflow therethrough. Another embodiment is provided in which the washers are placed side-by-side and are of differing densities. The inner washer diameters are of differing sizes so that a portion of the washers do not contact the inner tube, but are instead spaced a distance radially away from the inner tube outer surface.

In accordance with yet further aspects of this invention, a second embodiment of a muffler is provided, including an inner tube with a plurality of holes extending a first distance, a number of washers positioned about the inner tube, a flexible outer sleeve positioned about the combination of washers and inner tube, and first and second end caps. The inner tube includes a proximal end adapted to connect to the pneumatic hand tool exhaust port. A portion of the washers are placed side-by-side and have inner diameters sized to contact the inner tube. The outer sleeve includes at least one of plastic, rubber, and synthetic fiber. The first end cap is attached to the proximal washer, the second end cap is attached to the distal washer. During use, exhaust air pass from the hand tool out the exhaust port, into the inner tube, out the inner tube holes directly into the washers, through the washers, and out the outer sleeve.

In accordance with still other aspects of this invention, a third embodiment of a muffler is provided, including an inner tube having proximal and distal ends, a number of washers positioned longitudinally about the inner tube, a flexible outer sleeve having a plurality of passages through which air may expel, and attachment means adapted to connect the muffler with the handle. The inner tube further includes first and second sections and a plurality of holes extending at least along the second section. The first section is adapted to be located within the handle exhaust passage. The second section is adapted to be located outside the handle. The washers are positioned longitudinally about the inner tube at least at the location of the plurality of holes in the inner tube second section. The flexible outer sleeve is positioned about the combination of washers and inner tube second section.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is a partial cross-sectional side view of a first embodiment muffler formed in accordance with the present invention;

FIG. 3A is a cross-sectional side view of a third embodiment of a muffler formed in accordance with the present invention;

FIGS. 3B and 3C are plan views of upper and lower fittings shown in FIG. 3A;

FIG. 5A is a cross-sectional side view of a fifth embodiment muffler formed in accordance with the present invention; and FIG. 5B is a plan view of the distancing washer shown in FIG. 5A.

DETAILED DESCRIPTION OF THE PREFERRED EMBODIMENT

Figure 2A:
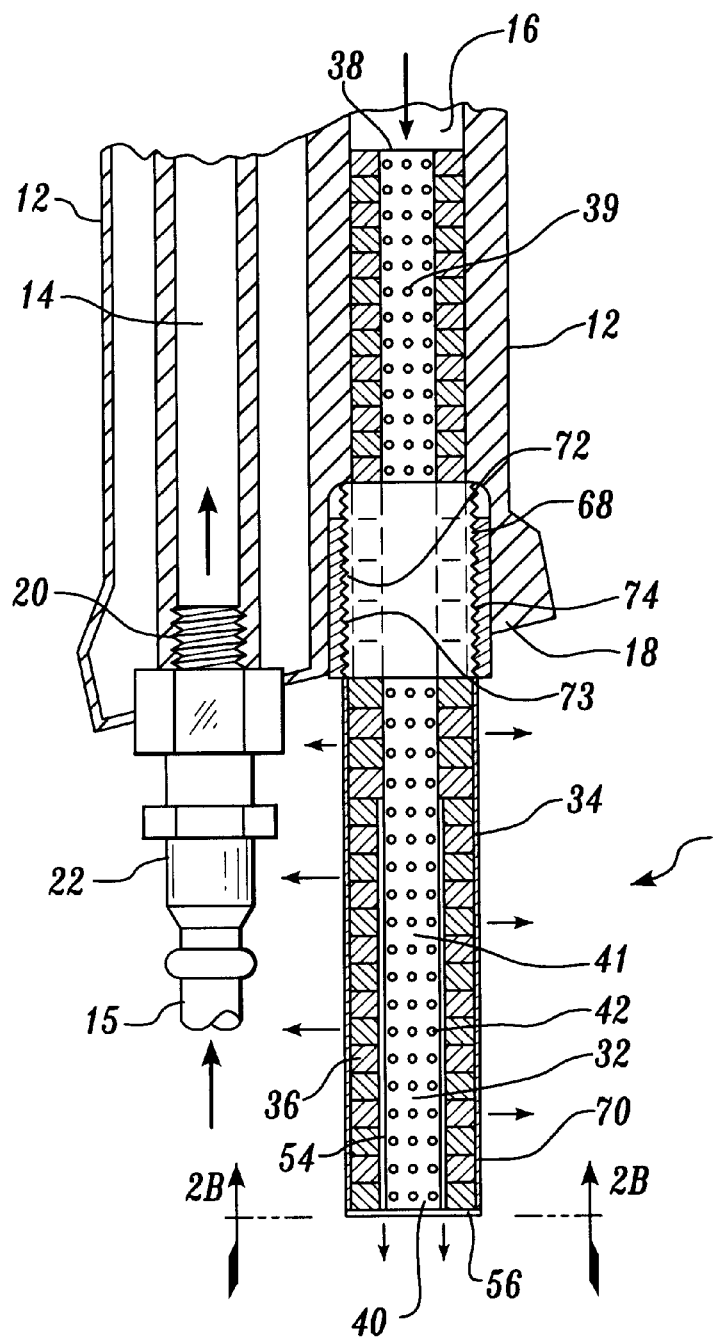
FIG. 2A is a partial cross-sectional side view of a second embodiment of a muffler formed in accordance with the present invention.

The present invention is a muffler for use in quieting exhaust expelled from a pneumatic hand tool. The present invention is compact, lightweight, and easy to use. In select embodiments, the muffler is adapted for immediate connection to known pneumatic hand tools, with only minimal changes required to the hand tool. A number of embodiments of the present invention are described below with reference to the accompanying drawings. It should be appreciated that these embodiments are provided to illustrate various features of the present invention, and thus should not be viewed as limiting with regard to the specific combination of their configurations.

Referring to FIG. 1, a pneumatic hand tool 10 generally includes a handle 12 within which an air intake passage 14 and an air exhaust passage 16 extend and end at respective openings in the bottom surface 18 of the handle. The air intake passage opening includes threads 20 adapted to connect to an air supply line 15 via a standard air coupler 22 or the like. The supply line 15 is in communication with a pressured air supply source (not shown.) A muffler formed in accordance with the present invention connects to the exhaust passage 16 using any one of a number of means, depending on the handle configuration of the tool.

Shown in FIG. 1 is a first embodiment of a muffler 30 formed in accordance with the present invention. FIG. 1 is a partial cutaway drawing. At the location of the muffler 30, the inner tube 32 is shown in side view, not in cross-sectional side view. The muffler 30 includes an inner tube 32 having proximal and distal ends 38, 40, an outer sleeve or tube 34, and a number of washers 36. Each washer is preferably circular with a centered circular inner hole. The inner tube 32 is positioned within the area defined by the stacked washer inner holes. The inner tube 32 is formed from a relatively lightweight rigid material, e.g., plastic, metal alloys, steel, etc. The inner tube 32 includes a plurality of holes 42 distributed about the inner tube along its longitudinal length. In the embodiment of FIG. 1, the inner tube proximal end 38 preferably includes outer threads 44 adapted to screw into corresponding threads formed in the exhaust passage 16 near the exhaust opening. Other known attachment means, however, may be used, e.g., adhesive, latches, clamps, snaps, bolts, crosspins, etc.

Still referring to FIG. 1, the washers 36 are similarly sized to one another and are positioned side-by-side so that their inner holes are aligned. The inner tube 32 is located within the area defined by the aligned washer holes. The number of washers 36 should be sufficient to extend the length of the inner tube for which there are holes. The washers 36 are made of a suitable sound dampening and/or filtering material such as felt, gauze, rubber, foam, fiber, synthetics, etc. The washers should be of a density sufficient to dampen the noise, but not dense enough to cause a significant back pressure in the exhaust passage 16. An exemplary high density felt washer that has yielded good results is manufactured by All Felt Products of Engleside, Ill., product number F-1 S.A.E. During testing, this washer decreased the noise level by approximately 15 decibels, while causing a back pressure of less than about 2.5 psi as measured in a standard pneumatic hand tool. In addition, the washers preferably include mold and moisture-resisting chemicals.

As shown in FIGS. 1, 3, and 4, the washer inner hole diameters are all the same size, and the washer outer diameters are all the same size. In general, a muffler formed in accordance with the present invention may include washers of various inner and outer diameters. For example, the configurations of FIGS. 2A and 5A show washers of like outer diameters and varying inner diameters. In addition, the washers may be of varying densities and/or thickness'. The size, density, and arrangement of the washers will affect the rate at which the exhaust air is slowed and hence will effect exhaust noise and back pressure. Accordingly, a designer should carefully consider the number, size, density, material, and placement of the washers 36 in the muffler.

The combination of washers 36 and inner tube 32 is located within the outer sleeve 34. Referring back to the embodiment of FIG. 1, the outer sleeve 34 is sized to contact the outer perimental surfaces of the washers. The outer sleeve 34 is preferably formed from a lightweight flexible fabric that includes air passages. Example flexible materials include loose-knit or woven nylon fabric, canvas, polyester, wool, perforated flexible plastic, perforated tape, other synthetic fabrics, perforate sealant, etc. It is also possible to form the outer sleeve form a rigid material, e.g., rigid plastic, perforated metal or metal foil, etc.

Still referring to FIG. 1, the washers extend along the inner tube between the tube distal end and the inner tube location adjacent the proximal end threads. A lower seal or cap 50 closes off the inner tube distal end 40 and the last washer which is positioned at the distal end. An upper sealant or cap 50' closes off the end washer near the proximal end. Although the caps 50, 50' may be flexible or rigid, they do not allow airflow therethrough in the embodiment of FIG.

1. During use, exhaust air enters the inner tube proximal end 38 from the exhaust passage 16, travels down the inner tube and outward through the inner tube holes and into the washers. At the washers 36, the exhaust is slowed and the exhaust noise is consequently reduced. The exhaust air then travels radially out the washers and through the outer sleeve 34 air passages to the atmosphere. As will be appreciated from viewing FIG. 1, the caps on the first and last washers force the exhaust air to travel radially outward through the washers.

Figure 2B:
FIG. 2B is a plan view of a lower cap shown in FIG. 2A.

Shown in FIGS. 2A and 2B is a second embodiment of a muffler 30 formed in accordance with the present invention. FIG. 2A is also a partial cutaway drawing. At the location of the handle 12 and the muffler 30, the inner tube 32 and the components labeled 56 and 72 are shown in side view, not in cross-sectional side view. Similar to the first embodiment, the second embodiment also includes an inner tube 32 having proximal and distal ends 38, 40, and a plurality of holes 42 therethrough. The muffler 30 further includes a first portion 39 and a second portion 41. The first portion 39 is located near the inner tube proximal end 38. The second portion 41 is located near the distal end 40. The holes 42 are located at least along the length of the inner tube second portion 41. The first portion is surrounded by a plurality of similarly-sized stacked circular washers 36. The combination of the first portion and its respective washers is positionable within the exhaust passage 16 via the exhaust opening. The outer diameters of these washers are preferably sized to contact the surface of the exhaust passage inside the handle.

The second portion 41 is surrounded by washers and an outer sleeve 34. The outer sleeve includes first and second ends 68, 70. The outer sleeve first end 68 is located between the proximal and distal inner tube ends 38, 40. The outer sleeve second end 70 is located near the inner tube distal end 40. The outer sleeve first end 68 is formed as a rigid annular member 72 that includes a threaded outer surface 73. As shown in FIG. 2A, the handle exhaust opening is modified to include mating threads 74 adapted to engage the outer sleeve first end threaded outer surface 73. The mating threads 74 may be formed from a nut that is inserted in the exhaust opening, formed integrally at the exhaust opening during manufacture of the handle, formed at the opening after formation of the handle, or formed using any other methods available for creating threading. The mating threads of FIG. 2A are provided by a cylindrical nut that is glued, cemented, or heat welded to an existing handle exhaust opening. What is important to the second embodiment of the present invention is that the nut be securely attached to the handle so that it will not move during use of the hand tool.

Still referring to FIG. 2A, washers 36 of differing densities are arranged alternatingly along the inner tube 32. In addition to density variations, some of the washers along the inner tube second portion have a larger inner diameter than other of the washers. This provides a passage 54 for exhaust air to travel in addition to passage out the washers. The second embodiment muffler includes a perforated lower end cap 56 shown in plan view in FIG. 2B. The perforated lower cap includes a ring of holes 58 positioned to align with the passage 54 during use.

A third embodiment of a muffler 30 formed in accordance with the present invention is shown in FIGS. 3A–3C. FIG. 3A is a partial cutaway drawing. At the location of the muffler 30, the inner tube 32 and the components labeled 64 and 64 are shown in side view, not in cross-sectional side view. Referring particularly to FIG. 3A, this embodiment is similar to the first embodiment except that the inner tube is of a significantly longer length so that the inner tube holes and washers are correspondingly located farther from the hand tool 10. In addition, longitudinal spaces 60 are left between the washers. This arrangement provides noise reduction with even less amounts of back pressure than in either the first or second embodiments.

Upper and lower support fittings 62, 64 are used to cap the first and last washers. As shown in FIG. 3B, the upper support fitting 62 completely prohibits airflow. As shown in FIG. 3C, the lower support fitting 64 includes a number of openings 65 that allow airflow therethrough. Both the upper and lower support fittings 62, 64 include a central hole 67 through which the inner tube 32 extends. Both fittings 62, 64 additionally include an arm 66 adapted to attach to an air supply line 15. The attachment to the supply line helps to steady and support the muffler during use.

Figures 4A, 4B:
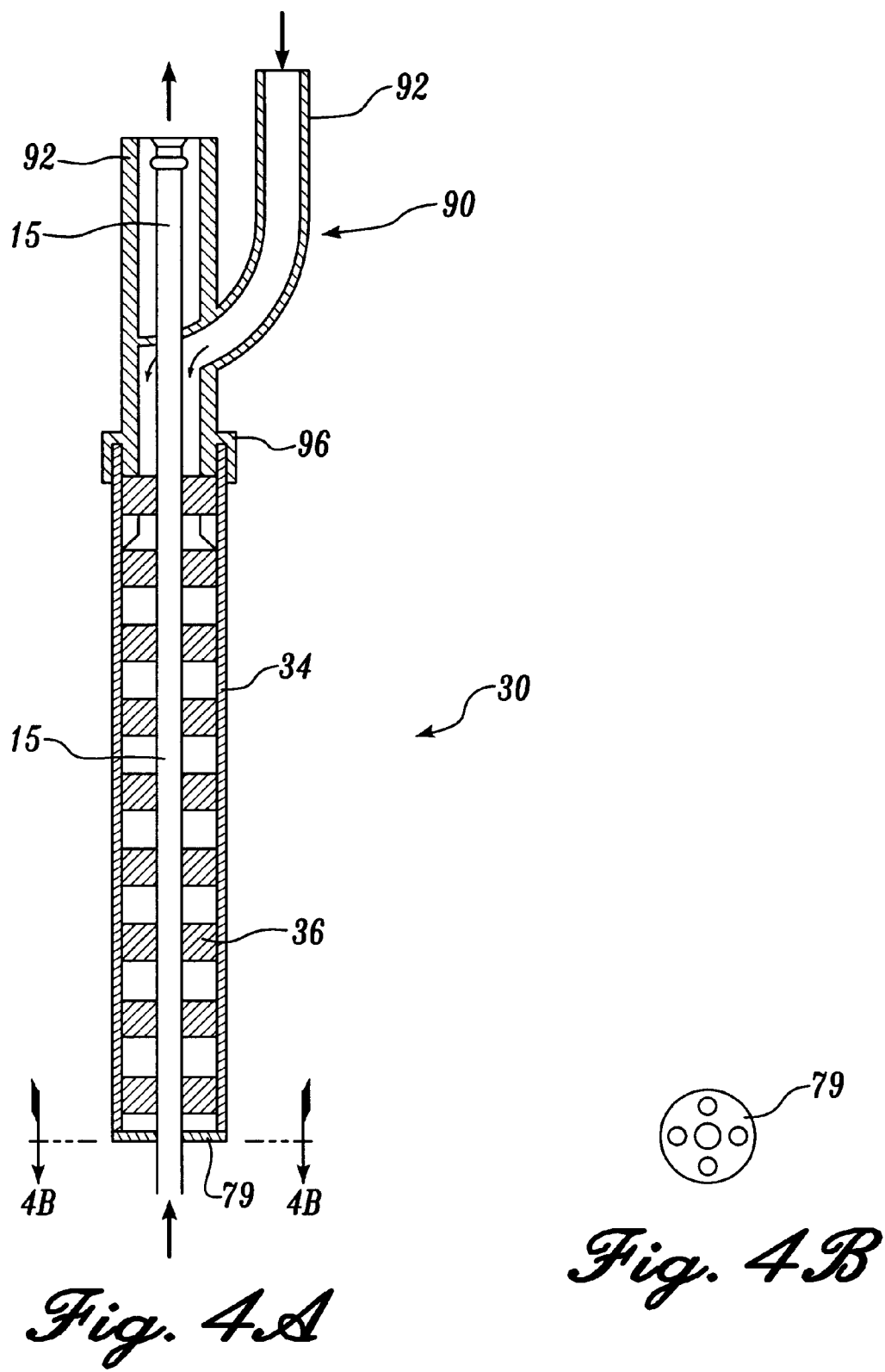
FIG. 4A is a cross-sectional side view of a fourth embodiment of a muffler formed in accordance with the present invention.
FIG. 4B is a view of an end cap taken along lines 4B—4B of FIG. 4A.

Fourth and fifth embodiments of a muffler 30 formed in accordance with the present invention are shown in FIGS. 4 and 5. These embodiments further stabilize the muffler 30 by forming the muffler about the supply line 15. In the fourth embodiment of FIGS. 4A and 4B, the handle exhaust opening is separate from the intake opening, similar to the handle configuration shown in FIG. 1. In the fifth embodiment of FIGS. 5A and 5B, the handle is formed to cause the exhaust passage 16 to surround the air intake passage 14. In general, both the fourth and fifth muffler embodiments include a perforate outer sleeve 34 surrounding a plurality of washers 36. There is no inner tube, instead the washers 36 are disposed about the air supply line 15. The muffler is closed at its distal end using a sealant or capping means 79 that may include perforations, depending on the flow requirements of a particular application.

Referring to FIGS. 4A and 4B, a Y-shaped attachment piece 90 is provided to connect the supply line 15 and muffler 30 with the air intake passage 14 and the exhaust passage 16, respectively. The Y-shaped attachment piece has an input arm 92 and an output arm 94 that connect directly to a standard coupler 22 and the exhaust passage 16 at the handle, respectively. The output arm 94 connects with the input arm 92 and surrounds it to form a single combined arm 96. The outer sleeve and washer components attach to the combined arm 96, with the supply line 15 passing through the washers inner holes.

Referring to the embodiment of FIGS. 5A and 5B, the supply line 15 is connected to the intake passage 14 via a standard coupler 22. A portion 80 of the handle exhaust passage is formed to envelope the intake opening and portions of the coupler 22. The muffler proximal end is adapted to connect to this exhaust passage portion 80. The muffler proximal end includes a coupler mating piece 82 and a rigid distancing washer 84. The mating piece 82 is held in the outer sleeve 34 by the distancing washer 84. The coupler mating piece 82 receives the standard coupler 22 at one end and connects to the air supply line 15 at the other end. The coupler mating piece 82 is of a smaller outer diameter so exhaust air is forced to pass around it and the supply line 15 and into the muffler washers 36.

As will be appreciated from a reading of the above, the present invention is a compact, lightweight, and easy to use device capable of effectively quieting exhaust expelled from a pneumatic hand tool while causing minimal amounts of back pressure on the pneumatic motor. The present invention may be attached to known hand tools with only minor changes required to the hand tool.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A muffler for quieting exhaust expelled from a pneumatic hand tool, the hand tool having a handle with an exhaust port, the muffler comprising:

(a) an inner tube having a plurality of holes, the inner tube including a proximal end having exterior threads adapted to connect to mating threads formed in the pneumatic hand tool exhaust port;

(b) a number of absorptive washers positioned longitudinally about the inner tube at the location of the plurality of holes; and (c) an outer sleeve positioned about the combination of washers and inner tube, the outer sleeve being formed from a breathable fabric material thus providing a plurality of passages through which air may pass;

wherein during use, exhaust air passes from the hand tool out the exhaust port, into the inner tube, out the inner tube plurality of holes, through the washers, and out the outer sleeve passages.

2. The muffler according to claim 1, wherein the number of washers are placed side-by-side along the inner tube and are of equal densities.

3. The muffler according to claim 1, wherein the number of washers each directly contact the inner tube.

4. The muffler according to claim 1, wherein the number of washers are formed from a material in the group comprising felt, gauze, rubber, foam, and synthetic fiber.

5. The muffler according to claim 1, further comprising first and second end seals, wherein the number of washers includes first and last washers, the first end seal being located adjacent the first washer, the second end seal being located adjacent the last washer; the end seals prohibiting airflow therethrough.

6. The muffler according to claim 1, wherein the breathable fabric outer sleeve is formed from a material including at least one of nylon, canvas, plastic, rubber, and synthetic fiber.

7. A muffler for quieting exhaust expelled from a pneumatic hand tool, the hand tool having a handle with an exhaust port, the muffler comprising:

(a) an inner tube having a plurality of holes, the inner tube including a proximal end having exterior threads adapted to connect to mating threads formed in the pneumatic hand tool exhaust port;

(b) a number of absorptive washers positioned longitudinally about the inner tube at the location of the plurality of holes; wherein the number of washers are placed side-by-side and are of differing densities; and (c) an outer sleeve positioned about the combination of washers and inner tube, the outer sleeve being formed from a flexible material and having a plurality of passages through which air may pass;

wherein during use, exhaust air passes from the hand tool out the exhaust port, into the inner tube, out the inner tube plurality of holes, through the washers, and out the flexible outer sleeve passages.

8. A muffler for quieting exhaust expelled from a pneumatic hand tool, the hand tool having a handle with an exhaust port, the muffler comprising:

(a) an inner tube having a plurality of holes, the inner tube including a proximal end having exterior threads adapted to connect to mating threads formed in the pneumatic hand tool exhaust port;

(b) a number of absorptive washers positioned longitudinally about the inner tube at the location of the plurality of holes; wherein the number of washers include washers of differing inner diameters so that a portion of the washers does not contact the inner tube; and (c) an outer sleeve positioned about the combination of washers and inner tube, the outer sleeve being formed from a flexible material and having a plurality of passages through which air may pass;

wherein during use, exhaust air passes from the hand tool out the exhaust port, into the inner tube, out the inner tube plurality of holes, through the washers, and out the flexible outer sleeve passages.

9. In a pneumatic hand tool having a handle with an exhaust port, the improvement comprising a muffler including:

(a) an inner tube with a plurality of holes extending a first distance, the inner tube including a proximal end adapted to connect to the pneumatic hand tool exhaust port;

(b) a number of washers positioned about the inner tube, a portion of the number of washers being placed side-by-side and having inner diameters sized to contact the inner tube;

(c) an outer sleeve positioned about the combination of washers and inner tube, the outer sleeve being formed from a breathable fabric material including at least one of plastic, rubber, and synthetic fiber; and (d) first and second end caps, the first end cap being attached to the proximal washer, the second end cap being attached to the distal washer;

wherein during use, exhaust air pass from the hand tool out the exhaust port, into the inner tube, out the inner tube holes directly into the washers, through the washers, and out the outer sleeve.

10. A muffler for quieting exhaust expelled from a pneumatic hand tool, the hand tool having a handle with an exhaust port that connects to an exhaust passage located within the handle, the muffler comprising:

(a) an inner tube having proximal and distal ends, the inner tube further including first and second sections and a plurality of holes extending at least along the second section, the first section being adapted to be located within the handle exhaust passage, the second section being adapted to be located outside the handle;

(b) a number of washers positioned longitudinally about the inner tube at least at the location of the plurality of holes in the inner tube second section;

(c) an outer sleeve positioned about the combination of washers and inner tube second section, the outer sleeve having a plurality of passages through which air may expel; and (d) attachment means adapted to connect the muffler with the handle;

wherein during use, exhaust air passes from the hand tool out the exhaust port, into the inner tube, out the inner tube plurality of holes, through the washers, and out the outer sleeve.

11. The muffler according to claim 10, wherein the number of washers are placed side-by-side along the inner tube and are of equal densities.

12. The muffler according to claim 10, wherein the number of washers are formed from a material in the group comprising felt, gauze, rubber, foam, and synthetic fiber.

13. The muffler according to claim 10, further comprising an end cap for sealing the distal end of the muffler.

14. The muffler according to claim 10, wherein the outer sleeve is formed from a fabric material including at least one of nylon, canvas, plastic, rubber, and synthetic fiber.

15. A pneumatic apparatus comprising:
(a) a pneumatic hand tool having a handle with an exhaust port that connects to an exhaust passage located within the handle; and
(b) a muffler for quieting exhaust expelled from the pneumatic hand tool, the muffler comprising:
  (i) an inner tube having proximal and distal ends, the inner tube further including first and second sections and a plurality of holes extending at least along the second section, the first section being adapted to be located within the handle exhaust passage, the second section being adapted to be located outside the handle;
  (ii) a number of washers positioned longitudinally about the inner tube at least at the location of the plurality of holes in the inner tube second section;
  (iii) an outer sleeve positioned about the combination of washers and inner tube second section, the outer sleeve having a plurality of passages through which air may expel; and
  (iv) attachment means adapted to connect the muffler with the handle;
wherein during use, exhaust air passes from the hand tool out the exhaust port, into the inner tube, out the inner tube plurality of holes, through the washers, and out the outer sleeve.

16. The muffler according to claim 15, wherein the outer sleeve is formed from a breathable fabric material including at least one of nylon, canvas, plastic, rubber, and synthetic fiber.

17. The muffler according to claim 15, wherein the outer sleeve is formed from a flexible material.

18. The muffler according to claim 15, wherein both the first and second inner tube sections include a plurality of holes.

* * * * *